Patented Jan. 13, 1942

2,269,791

UNITED STATES PATENT OFFICE 2,269,791

ESTERS OF P-AMINOBENZOIC ACID

Horace A. Shonle and Wilbur J. Doran, Indianapolis, Ind., assignors to Eli Lilly and Company, Indianapolis, Ind., a corporation of Indiana No Drawing. Application August 19, 1940, Serial No. 353,248

4 Claims. (Cl. 260—471)

This invention relates to esters of p-aminobenzoic acid and more particularly to alkyl-p-aminobenzoates.

Local anesthetics which are administered in the form of oils and ointments are especially useful in the treatment of burns, dermatosis, and in the installation of instruments incident to the examination of the bladder and trachea. The anesthetic employed for this purpose must be oil soluble and must not produce irritation of the delicate membranes and other parts of the body with which it contacts. In general, the period of insensibility produced by an oil-soluble anesthetic per unit weight is a direct index of its effectiveness as an anesthetic. When employed for locally desensitizing an area of the body for the installation of instruments in an examination, the anesthetic to be effective must cause insensibility for the period of the examination. The greater number of oil-soluble anesthetics heretofore employed which do not cause irritation, do not produce insensibility for a sufficiently long period to be satisfactory for certain therapeutic applications.

In accordance with this invention, compositions are employed which are oil-soluble and which possess longer periods of anesthesia than any other oil-soluble local anesthetic investigated other than 1-methylbutyl-p-aminobenzoate which is disclosed and claimed in the copending application of H. A. Shonle and W. J. Doran, Serial No. 353,249 filed August 19, 1940. These compositions are particularly useful in the preparation of local anesthetic oils and ointments.

The compositions of this invention may be represented by the following formula:

(1) 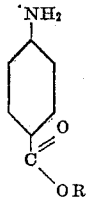

in which R is a saturated branch chain alkyl radical having more than five and less than eight carbon atoms, the first branching occurring at the first or second carbon atom, the longest chain having not more than five carbon atoms, any side chain having not more than two carbon atoms, and no two side chains being attached to the same or adjacent carbon atoms. Examples of specific compositions which fall within the purview of this invention are:

1-methylpentyl-p-aminobenzoate
1,3-dimethylbutyl-p-aminobenzoate
2-ethylbutyl-p-aminobenzoate
2,4-dimethylpentyl-p-aminobenzoate The general method of preparing the compositions of this invention is as follows:

One mol of p-nitrobenzoyl chloride in the presence of a suitable base, such as pyridine, is reacted with one mol of the desired alcohol which may be represented by the following formula:

(2) ROH

The reaction is exothermic and considerable heat is produced. For this reason, preferably the alcohol is added slowly to the p-nitrobenzoyl chloride. During this reaction R-p-nitrobenzoate is formed. After the addition, desirably, the mixture is heated at a temperature between 80° and 100° C. for approximately a half hour in order to complete the reaction. The reaction which takes place may be represented by the following equation:

(3) 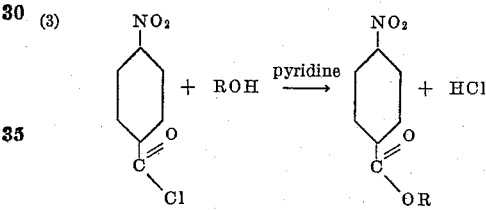

Water is added to the reaction mixture and an oil layer separates which contains the R-p-nitrobenzoate. A suitable organic solvent, such as ether or benzene, is added to the mixture which dissolves the R-p-nitrobenzoate. The aqueous layer is separated from the ether or benzene layer, which contains the R-p-nitrobenzoate in the organic solvent. If an organic base is used, the ether or benzene layer is washed with dilute acid, such as hydrochloric acid, to remove any unreacted organic base. The ether or benzene layer is then washed with dilute alkali, such as dilute sodium hydroxide or potassium carbonate, to remove the small amount of p-nitrobenzoic acid formed in the reaction. The organic solvent is then removed from the R-p-nitrobenzoate by any suitable means such as distillation in vacuum.

The R-p-nitrobenzoate may be reduced to the R-p-aminobenzoate by a suitable reduction method, such as reduction with iron and dilute non-oxidizing acid, catalytic hydrogenation, or ammonium sulfide. For example, the R-p-nitrobenzoate is mixed with from four to five mols of iron in a relatively finely divided state. Water is added and then approximately 0.2 mol of a non-oxidizing acid, such as hydrochloric or acetic acid, is introduced into the reaction mixture. The mixture is agitated for a period of about four hours, during which time the R-p-nitrobenzoate is reduced to the R-p-aminobenzoate. The reaction which takes place may be represented by the following equation:

(4) 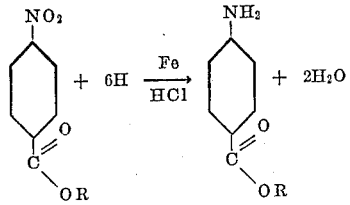

The R-p-aminobenzoate in the mixture is extracted by means of a suitable organic solvent, such as benzene or ether. A quantity of the solvent is added to the reaction mixture, agitated, and the solvent layer, which contains the R-p-aminobenzoate, is separated from the mixture. The solvent in the solvent extract is removed by any convenient means, such as evaporation in vacuum. The residue, after removal of the solvent, may be purified by fractional distillation or, if the R-p-aminobenzoate is a solid, by recrystallization from a suitable solvent, such as dilute alcohol, or the hydrochloride of the R-p-aminobenzoate may be prepared and washed with a suitable solvent, such as ether. In the event that the hydrochloride is formed for purposes of purification the corresponding R-p-aminobenzoate is, if required, obtained by treatment with dilute alkali, such as dilute sodium hydroxide.

Examples of the preparation of specific compositions of this invention are as follows:

EXAMPLE 1.—*Preparation of 1-methylpentyl-p-aminobenzoate*

To 186 g. (1 mol) of p-nitrobenzoyl chloride is added a mixture of 104 g. (1.02 mols) of 1-methylpentanol and 80 g. (1.01 mols) of pyridine with stirring and cooling during the addition. After the addition is completed, the mixture is heated for one half hour at a temperature between 80° and 100° C. The desired intermediate product, 1-methylpentyl-p-nitrobenzoate, is formed in this reaction. To the reaction mixture about 200 cc. of water are added, then about 300 cc. of ether are added to dissolve the 1-methylpentyl-p-nitrobenzoate. The mixture is well agitated and then permitted to stand. It separates into two layers. The water layer is discarded, while the ether layer is washed twice with approximately 100 cc. portions of 0.5N hydrochloric acid. The ether layer is then washed twice with about 100 cc. portions of 1 N sodium hydroxide. The ether in the ether layer is removed by vacuum distillation. The residue, which is the 1-methylpentyl-p-nitrobenzoate, is an oil at room temperatures.

The 1-methylpentyl-p-nitrobenzoate is mixed with about 250 g. of iron filings. About 140 cc. of water are added to the mixture. About 40 cc. of glacial acetic acid are then added and the mixture agitated on a steam bath for a period of about five hours. The 1-methylpentyl-p-aminobenzoate is formed during this reaction. Approximately 200 cc. of ether are added, the mixture is well agitated and then permitted to stand. The ether layer, which contains the 1-methylpentyl-p-aminobenzoate, is decanted off and the ether removed therefrom by means of vacuum distillation. To purify the 1-methylpentyl-p-aminobenzoate, the hydrochloride or other salt of this compound is preferably formed and subsequently the 1-methylpentyl-p-aminobenzoate is obtained from the salt, if the parent compound is desired. The hydrochloride is produced by dissolving the residue containing the 1-methylpentyl-p-aminobenzoate in about 300 cc. of anhydrous ether and saturating the ether solution with dry hydrogen chloride. The 1-methylpentyl-p-aminobenzoate hydrochloride which is formed during the passage of hydrogen chloride through the ether solution separates out, is filtered and washed with anhydrous ether. The 1-methylpentyl-p-aminobenzoate hydrochloride is dissolved in about 1000 cc. of water. About 400 cc. of 10% sodium hydroxide are added to the water solution to neutralize the hydrochloric acid present. The 1-methylpentyl-p-aminobenzoate is extracted with 300 cc. of ether and the ether is evaporated by vacuum distillation. The residue, which is the 1-methylpentyl-p-aminobenzoate, is an oil at room temperatures and may be represented by the following formula:

(5) 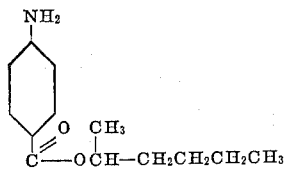

EXAMPLE 2.—*Preparation of 1,3-dimethylbutyl-p-aminobenzoate*

To 18.6 g. (0.1 mol) of p-nitrobenzoyl chloride are added 16 g. (0.2 mol) of pyridine. To this mixture 11 g. (0.1 mol) of 1,3-dimethylbutanol-1 are added. An exothermic reaction results in which 1,3-dimethylbutyl-p-nitrobenzoate is formed. The 1,3-dimethylbutyl-p-nitrobenzoate is separated from the reaction mixture and purified in the same manner as the analogous 1-methylpentyl-p-nitrobenzoate in Example 1. The 1,3-dimethyl-p-nitrobenzoate is an oil at room temperatures.

The 1,3-dimethylbutyl-p-nitrobenzoate may be reduced to 1,3-dimethylbutyl-p-aminobenzoate by means of ammonium sulfide. For this purpose, 26 cc. of concentrated ammonium hydroxide (28% $NH_3$) are diluted to 100 cc. with water and saturated with hydrogen sulfide. To a solution of 16 g. of 1,3-dimethylbutyl-p-nitrobenzoate in 100 cc. of alcohol is added the ammonium sulfide solution. The mixture is heated on a steam bath until sulfur separates, during which time the 1,3-dimethylbutyl-p-aminobenboate is formed. The sulfur is filtered off and the filtrate is heated until most of the alcohol has evaporated. An oil, which is the desired 1,3-dimethylbutyl-p-aminobenzoate, separates. It is purified by recrystallization from dilute alcohol. It has a melting point of about 70.0° to 72.0° C., corrected, and may be represented by the following formula:

(6) 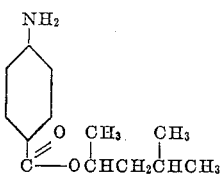

EXAMPLE 3.—*Preparation of 2,4-dimethylpentyl-p-aminobenzoate*

To 18.6 g. (0.1 mol) of p-nitrobenzoyl chloride is added a mixture of 12 g. (0.1 mol) of 2,4-dimethylpentanol-1 and 16 g. (0.2 mol) of pyridine. The 2,4-dimethylpentyl-p-nitrobenzoate formed in this reaction is separated and purified in the same manner as the analogous 1-methylpentyl-p-nitrobenzoate in Example 1.

The 2,4-dimethylpentyl-p-nitrobenzoate may be reduced to the 2,4-dimethylpentyl-p-aminobenzoate in accordance with the like procedure described in Example 1 or 2. The 2,4-dimethylpentyl-p-aminobenzoate has a melting point of about 59.0° to 61.0° C., corrected, and may be represented by the following formula:

(7) 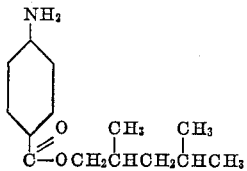

EXAMPLE 4.—*Preparation of 2-ethylbutyl-p-aminobenzoate*

To 18.6 g. (0.1 mol) of p-nitrobenzoyl chloride are added 16 g. (0.2 mol) of pyridine. To this mixture are added 11 g. (0.1 mol) of 2-ethylbutanol-1 to form 2-ethylbutyl-p-nitrobenzoate. The 2-ethylbutyl-p-nitrobenzoate formed is separated and purified in the same manner as the analogous 1-methylpentyl-p-nitrobenzoate in Example 1.

The 2-ethylbutyl-p-nitrobenzoate may be reduced to the desired 2-ethylbutyl-p-aminobenzoate in accordance with the like procedure described in Example 1 or 2. The 2-ethylbutyl-p-aminobenzoate melts at about 57.0° to 59.0° C., corrected and may be represented by the following formula:

(8) 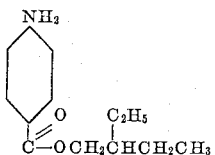

The alkyl-p-aminobenzoates of this invention may be dissolved in oils or ointments for use as local anesthetics. Among the oils which may be employed for the purpose is an oil selected from the class which consists of vegetable oils, such as cottonseed oil, peanut oil, sesame oil, or olive oil; or a lower-alkyl ester of a fatty acid, the alkyl group having not more than six carbon atoms, such as ethyl oleate or the ethyl or n-propyl esters of the fatty acids of cocoanut oil, olive oil, peanut oil or sesame oil. For example, a solution of 1-methylpentyl-p-aminobenzoate is prepared by dissolving 0.5 g. of 1-methylpentyl-p-aminobenzoate in 100 cc. of peanut oil or ethyl oleate. This solution is an effective local anesthetic for topical applications.

What is claimed is:

1. An alkyl p-aminobenzoate selected from the class which consists of 1,3-dimethylbutyl-p-aminobenzoate; 2,4-dimethylpentyl-p-aminobenzoate; and 2-ethylbutyl-p-aminobenzoate.
2. 1,3-dimethylbutyl-p-aminobenzoate.
3. 2,4-dimethylpentyl-p-aminobenzoate.
4. 2-ethylbutyl-p-aminobenzoate.

HORACE A. SHONLE.
WILBUR J. DORAN.